United States Patent
Cho et al.

(10) Patent No.: US 6,948,176 B2
(45) Date of Patent: Sep. 20, 2005

(54) COVER PLATE FOR OPTICAL DISK DRIVE

(75) Inventors: Eun-hyoung Cho, Kyungki-do (KR); Jin-seung Sohn, Seoul (KR); Jun-min Park, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 146 days.

(21) Appl. No.: 10/308,126

(22) Filed: Dec. 3, 2002

(65) Prior Publication Data

US 2003/0128645 A1 Jul. 10, 2003

(30) Foreign Application Priority Data

Jan. 5, 2002 (KR) .............................................. 2002-594

(51) Int. Cl.[7] .......................... G11B 17/03; G11B 17/00
(52) U.S. Cl. .................................... 720/600; 360/97.01
(58) Field of Search ................................ 720/600, 604; 369/75.11, 75.21, 77.11, 77.21; 360/97.01–97.04

(56) References Cited

U.S. PATENT DOCUMENTS

| | | | | |
|---|---|---|---|---|
| 5,214,549 A | * | 5/1993 | Baker et al. ............. | 360/97.02 |
| 6,172,842 B1 | * | 1/2001 | Satoh et al. ............. | 360/97.01 |
| 6,498,700 B2 | * | 12/2002 | Takahashi et al. ....... | 360/97.01 |
| 6,697,213 B2 | * | 2/2004 | Lofstrom et al. ........ | 360/97.01 |

FOREIGN PATENT DOCUMENTS

| | | |
|---|---|---|
| JP | 2001-176260 | 6/2001 |
| KR | 2000-0075152 | 12/2000 |

* cited by examiner

*Primary Examiner*—Allen Cao
(74) *Attorney, Agent, or Firm*—Buchanan Ingersoll PC

(57) ABSTRACT

A cover plate for an optical disk drive designed to reduce disk vibrations and noise is provided. The cover plate is installed above a main frame of the optical disk drive and has a through hole in the center through which a disk clamp for clamping a disk placed on a turntable is fitted and a projection formed to oppose the disk up to a predetermined height in order to narrow a gap with the disk. Furthermore, the cover plate has a circular step formed opposite a surface corresponding to an outer circumference of the disk in the shape of an annular groove for lowering acoustic energy density of noise. The cover plate constructed in this way reduces disk vibration due to air damping effects resulting from a narrow gap between the disk and the cover plate while suppressing noise due to the presence of the abruptly expanded portion. Furthermore, the cover plate can be implemented without a separate device by making simple changes to the structure of cover plate.

8 Claims, 9 Drawing Sheets

GAP (mm)

FREQUENCY (Hz)

COVER PLATE FOR OPTICAL DISK DRIVE

BACKGROUND OF THE INVENTION

This application claims the priority of Korean Patent Application No. 2002-594 filed on Jan. 5, 2002 in the Korean Intellectual Property Office, the disclosure of which is incorporated herein in its entirety by reference.

1. Field of the Invention

The present invention relates to an optical disk drive, and more particularly, to a cover plate for an optical disk drive designed to reduce vibration and noise occurring during the rotation of a disk.

2. Description of the Related Art

An optical disk drive is an apparatus that reads data from and writes data onto a recording medium such as a compact disk (CD) or a digital video disk (DVD) by emitting a laser beam onto the disk. An important research area in this respect is the possibility of achieving high speed and reducing noise and vibration of optical disk drives.

FIG. 1 is a schematic exploded perspective view of a conventional optical disk drive, and FIG. 2 is a vertical cross-section showing an assembled state of the optical disk drive of FIG. 1.

Referring to FIGS. 1 and 2, the conventional optical disk drive includes a main frame 10, a deck assembly 20 installed into the main frame 10, a tray 30, which has a surface 31 on which a disk D is to be placed, for loading/unloading the disk D by horizontally sliding into or out of the main frame 10, and a cover plate 40 installed above the main frame 10 for covering the disk D and the deck assembly 20.

The deck assembly 20 consists of a turntable 23 that accommodates the disk D transported by the tray 30, a spindle motor 24 for rotating the turntable 23, a deck plate 21 on which an optical pickup 25 for recording and playing back information on the disk D is mounted, and a deck base 22 that supports the deck plate 21 and is installed so that it can rotate with respect to the main frame 10 by means of a hinge pin 22a projecting out on its sides.

Reference numeral 11 denotes a loading motor for driving the tray 30 so that it can move into or out of the main frame 10. Reference 12 denotes a cam having a cam hole (not shown) into which a cam protrusion 22b of the deck base 22 is fitted. When driven by the loading motor 11, the cam 12 turns to move the cam protrusion 22b up or down. Thus, as the cam 12 turns, the cam protrusion 22b moves up and down along the cam hole, which enables the deck assembly 20 to rotate about the hinge pin 22a. In this configuration, when the disk is put in the tray 30 and introduced into the main frame 10, the cam 12 turns to rotate the deck assembly 20 so that the disk D is loaded on the turntable 23. Thereafter, when driven by the spindle motor 24, the turntable 23 rotates to enable the optical pickup 25 to play back information written on the disk D or record new information on the disk D.

A disk clamp 51 is combined into the cover plate 40 for clamping the disk D placed on the turntable 23. For this purpose, the cover plate 40 has a through hole structure 42 through which the disk clamp 51 is coupled to the disk D. A circular step 43 is formed around the inner circumference of the through hole structure 42 so that the outside edge of the disk clamp 51 is caught on the circular step 43. Furthermore, magnetic substances 51a and 23a are disposed in a bottom portion of the disk clamp 51 and in a top portion of the turntable 23, respectively. The disk D put on the turntable 23 is clamped between the turntable 23 and the disk clamp 51 due to an attractive force between the two magnetic substances 51a and 23a.

Reference numeral 52 denotes a cap attached to the cover plate 40 by a predetermined attaching means for preventing separation of the disk clamp 51 from the through hole structure 42. Reference numeral 41 denotes a groove for enhancing the strength of the cover plate 40 made of thin metal.

In an optical disk drive constructed in this way, high-speed rotating disks will usually undergo vibration. The vibration of a disk is known to be mainly-caused by excitation due to mass unbalance and spindle motor bearing defects, mechanical resonance, excitation due to instability in a rotating disk at critical speed, and disk fluttering. The vibration of a disk during the operation of an optical disk drive will degrade the reliability in recording/playing back data. Thus, in order to secure the reliability of an optical disk drive, there is a need to damp out vibration of the disk induced during its operation. However, the conventional optical disk drive described above has not yet adopted a structure to reduce vibrational effects of the disk.

Furthermore, as the speed of optical disk drives increases, a disk placed therein rotates with high-speed, thereby generating additional noise. Some examples include noise due to friction between the surface of a rotating disk and surrounding air, noise due to air flow created by a pressure difference between the inner and outer circumferences of the disk, noise generated as a result of the air flow colliding with walls around the surface of a tray on which the disk is to be placed, and noise due to turbulence created around the rotating disk. Since optical disk drives are adopted mostly in personal computers requiring its use in very quiet circumstances, the noise becomes a big problem that decreases work efficiency.

Conventionally, a passive method is used to mitigate noise; that is, gaps in doors, bezels, or main frames are closed with a sound-absorbent material or sound-insulating material to prevent noise from escaping. Recently, another method has proposed installing a separate noise controller in an optical disk drive.

FIG. 3 shows a disk chucking device used in an optical disk drive, the application of which was filed on May 29, 1999, by an applicant of this invention under Korean Patent Application No. 10-1999-019598 and laid open on Dec. 15, 2000, under Korean Patent Application Laid-open No. 2000-075152. In the optical disk drive shown in FIG. 3, a chuck plate 80 is provided between a disk D and a cover plate (not shown) to reduce various kinds of noise due to the rotation of the disk D. The chuck plate 80 is approximately disk-shaped and has a pair of holding portions 84 attached to the main frame 60 on both sides thereof. The chuck plate 80 further has a chuck 82 in the center. The chuck 82 is rotatably installed to perform chucking on the disk D placed on the turntable 62. A groove 86 is formed in the bottom edge of the chuck plate 80 for reducing various kinds of noise resulting from rotation of the disk D. Since noise being discharged outside has a drastically low acoustic energy density due to the presence of the groove 86, this allows noise reduction similar to a muffler of a car. Reference numerals 64, 66, and 70 denote a deck assembly, an optical pickup and a tray, respectively.

The conventional methods for reducing noise described above involve attaching a separate noise-insulating or noise-absorbent material to the gap in the optical disk drive or manufacturing a separate device such as a chuck plate to be installed between a disk and a cover plate. The methods require cumbersome and costly work thereby reducing productivity.

SUMMARY OF THE INVENTION

To solve the above and other problems, it is an aspect of the present invention to provide a cover plate for an optical disk drive designed to reduce disk vibration due to rotation of a disk It is another aspect of the present invention to provide a cover plate for an optical disk drive designed to reduce noise due to air flow as well as the disk vibration described above.

To achieve the above and other aspects, the present invention provides a cover plate for an optical disk drive, which is installed above a main frame of the optical disk drive and has a through hole in the center through which a disk clamp for clamping a disk placed on a turntable is fitted. The cover plate includes a projection formed to oppose the disk up to a predetermined height in order to narrow a gap with the disk. The projection is formed around the through hole in an annular shape.

The present invention also provides a cover plate for an optical disk drive, which is installed above a main frame of the optical disk drive and has a through hole in the center through which a disk clamp for clamping a disk placed on a turntable is fitted. The cover plate includes first and second projections jutting out toward the disk to predetermined heights for narrowing a gap between the cover plate and the disk, and a circular step formed between the first and second projections in the shape of an annular groove for lowering acoustic energy density of noise. The first projection, the second projection, and the abruptly expanded portion are formed at portions of the cover plate opposite surfaces corresponding to an inner circumference, an edge, and an outer circumference of the disk, respectively. Here, A sound-absorbent material may be attached to an inner wall of the circular step for absorbing some amount of the acoustic energy. The sound-absorbent material is preferably a sponge having numerous fine ventilation holes.

According to the present invention, air damping effects due to a narrow gap between the disk and the cover plate reduce disk vibration, while the presence of the circular step mitigates noise. Furthermore, the present invention can accomplish reduction in vibration and noise by making simple changes to the structure of the cover plate while eliminating the need for a separate device.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Preferred embodiments of a cover plate according to the present invention will now be described in detail with reference to the accompanying drawings.

Figure 1:
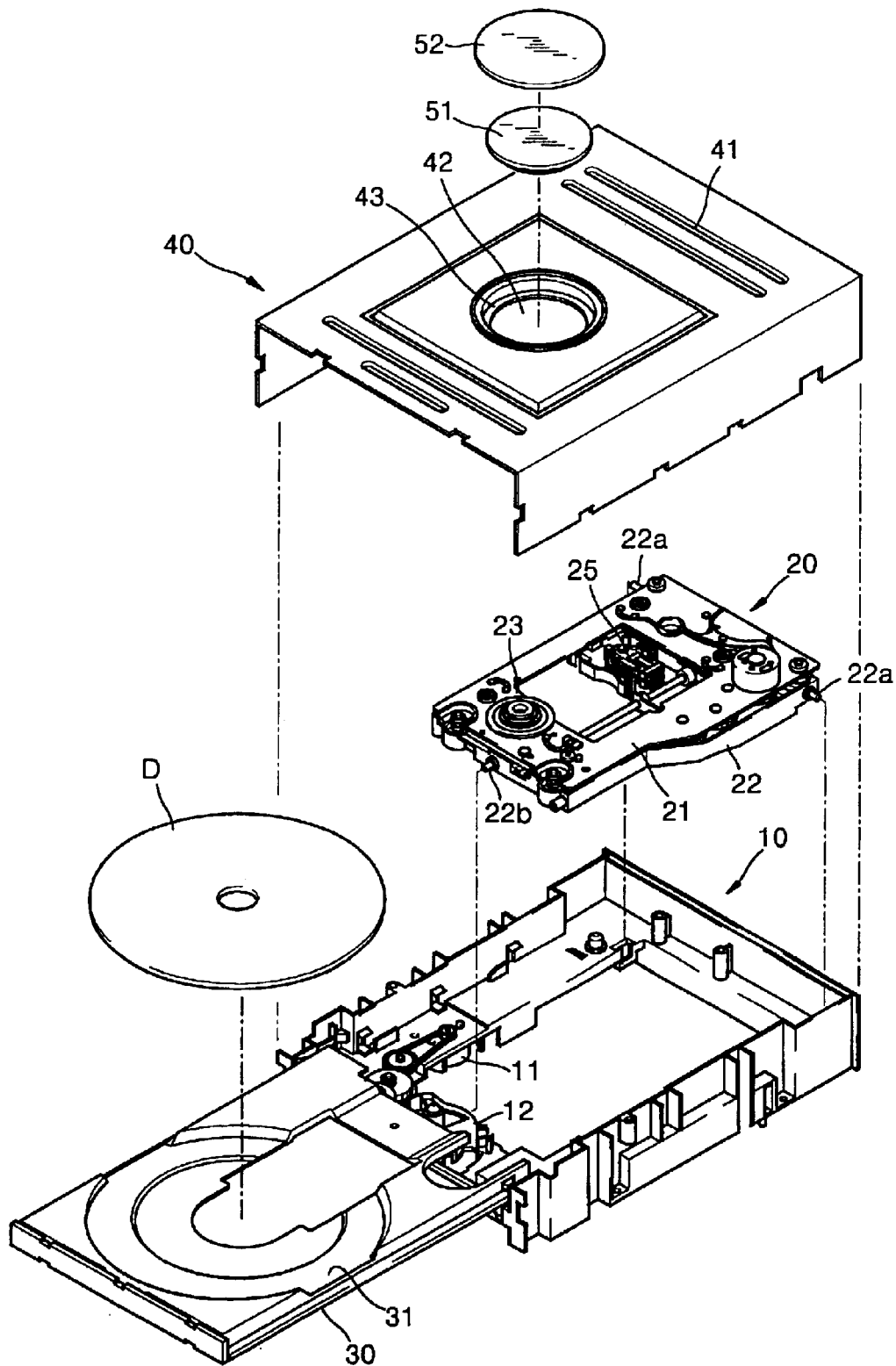
FIG. 1 is a schematic exploded perspective view of a conventional optical disk drive.
Figure 2:
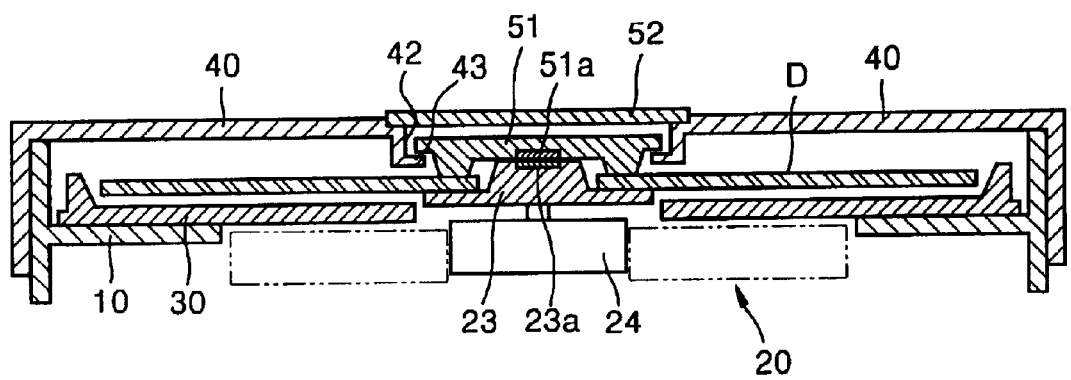
FIG. 2 is a schematic vertical cross-section showing an assembled state of the optical disk drive of FIG. 1.
Figure 3:
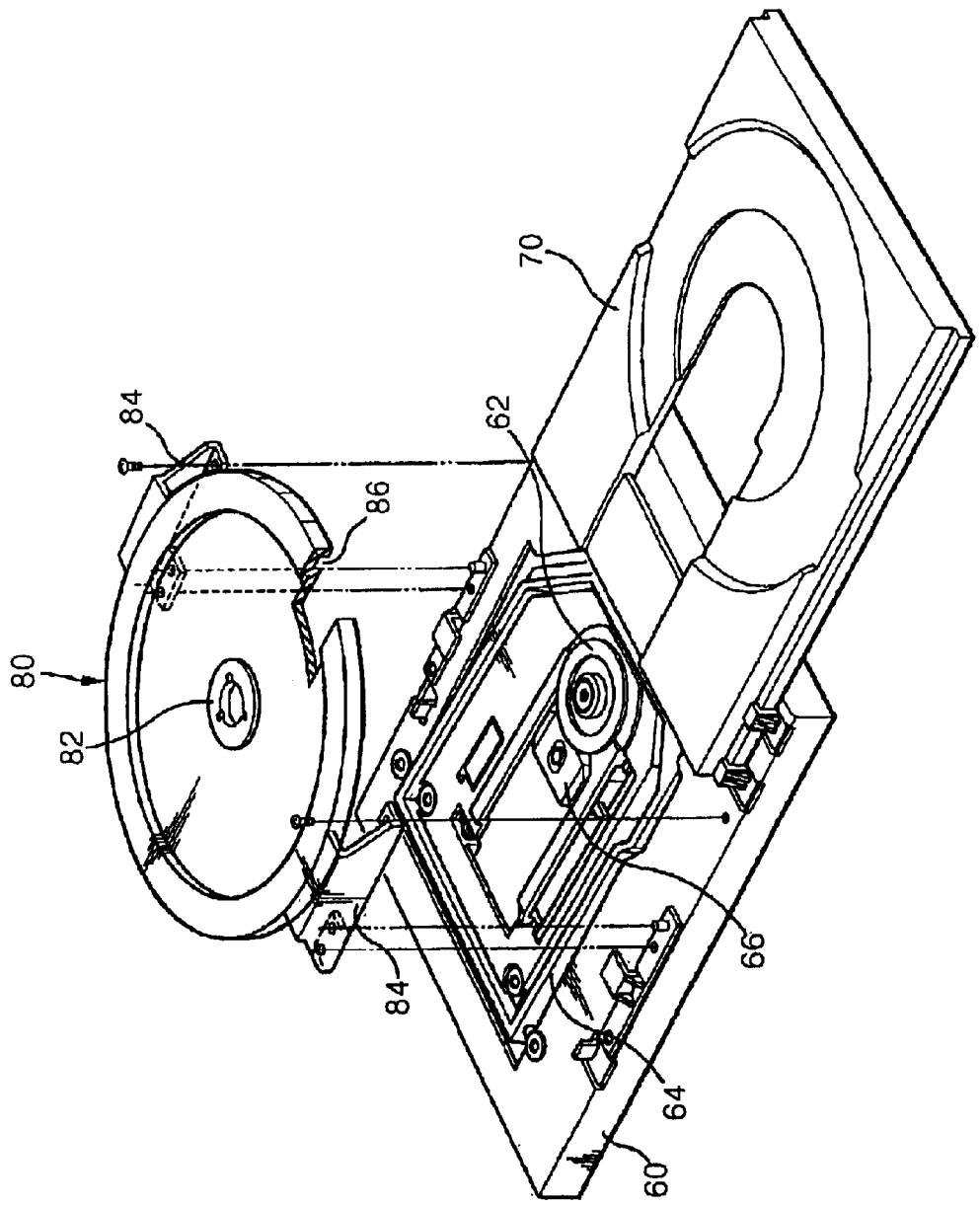
FIG. 3 is an exploded perspective view of an optical disk drive in which a chuck plate for reducing noise has been provided.
Figure 4:
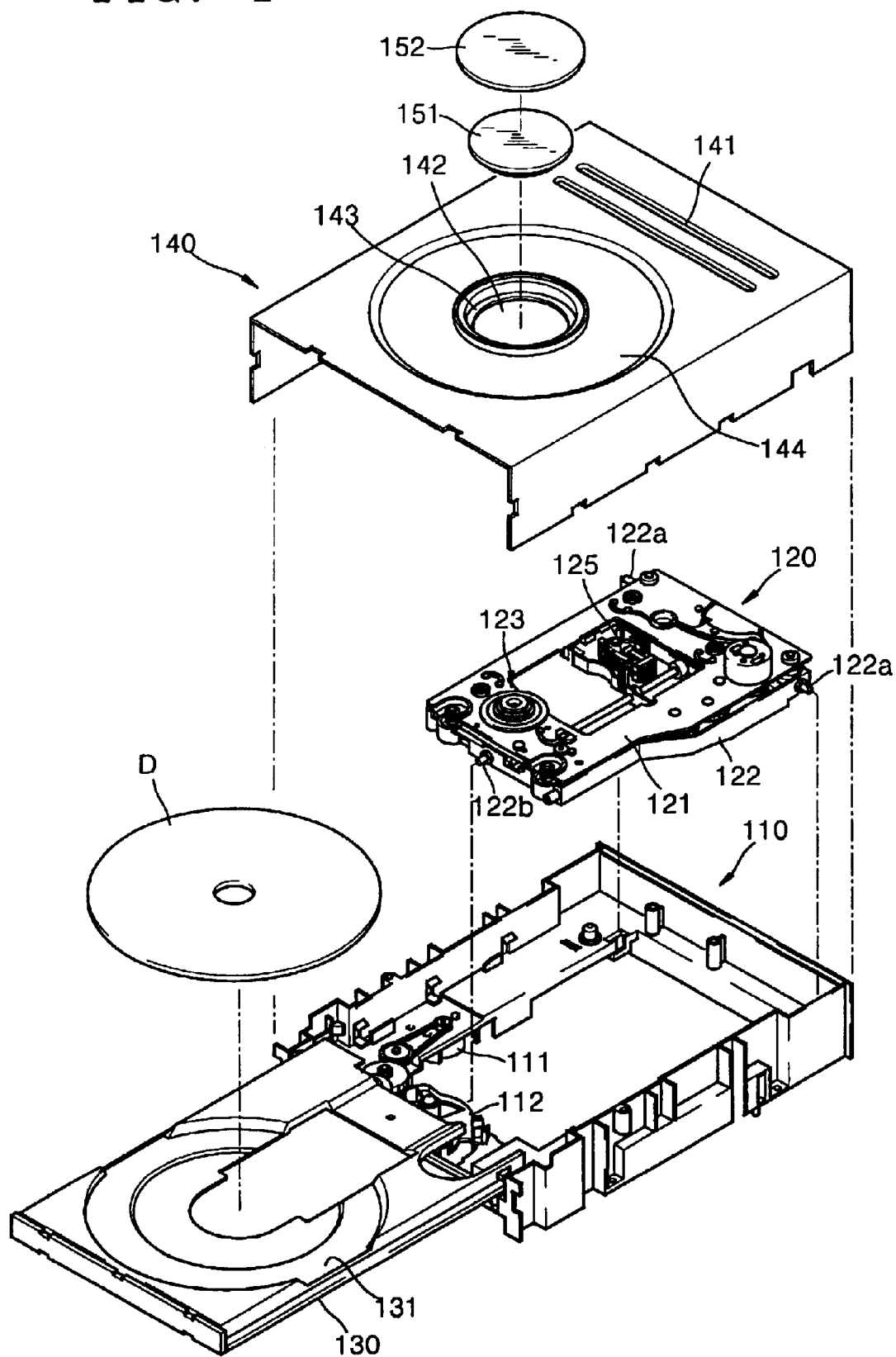
FIG. 4 is an exploded perspective view of a cover plate for an optical disk drive according to a first embodiment of the present invention.
Figure 5:
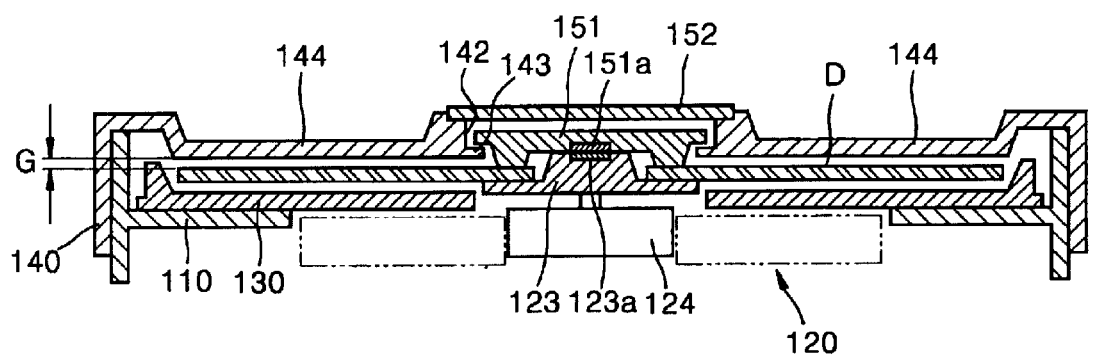
FIG. 5 is a vertical cross-section showing a state in which the cover plate of FIG. 4 has been coupled onto the main frame.

Referring to FIGS. 4 and 5, a cover plate 140 according to a first embodiment of the present invention is installed above a main frame 110 of an optical disk drive to cover a disk D and a deck assembly 120. A tray 130 having a surface 131 on which a disk D is to be placed and transporting the disk D is coupled to a main frame 110 so that it slides into or out of the main frame 110. A deck assembly 120 has a deck base 122, and a deck plate 121 supported by the deck base 122. The deck base 122 is installed so that it can rotate with respect to the main frame 110 by means of a hinge pin 122a projecting out on its sides. The deck plate 121 consists of a turntable 123 on which the disk D transported by the tray 130 is placed, a spindle motor 124 for rotating the turntable 123, and an optical pickup 125 for recording and playing back information on the disk D. The tray 130 is driven by the loading motor 120 so that it moves into or out of the main frame 110. The deck assembly 120 moves up and down by a cam protrusion 122a provided on the deck base 122 and a cam 112 provided in the main frame 110.

The cover plate 140 has a through hole structure 142, through which a disk clamp 151 for clamping the disk D placed on the turntable 123 is coupled, in the center of the cover plate 140. A circular step 143 is formed around the inner circumference of the through hole structure 142 so that the outside edge of the disk clamp 151 is caught on the circular step 143. Furthermore, the magnetic substances 151a and 123a are disposed in a bottom portion of the disk clamp 151 and in a top portion of the turntable 123, respectively. The disk D put on the turntable 123 is clamped between the turntable 123 and the disk clamp 151 due to an attractive force between the two magnetic substances 151a and 123a. A cap 152 is provided on the disk camp 151 to prevent the separation of the disk clamp 151 from the through hole structure 142. Furthermore, a groove 141 may be provided on the cover plate 140 for enhancing the strength of the cover plate 140 made of thin metal.

Figure 8:
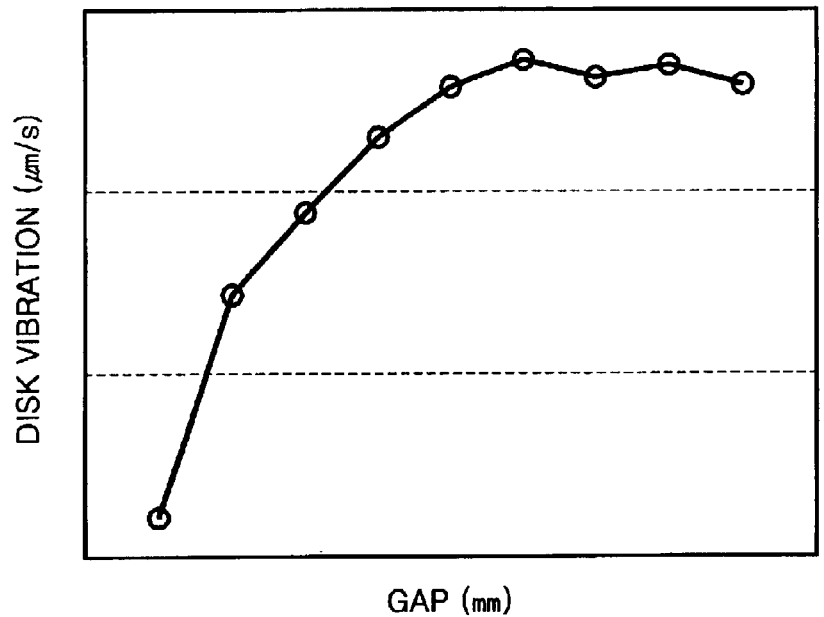
FIG. 8 is a graph showing changes in disk vibration with respect to changes in a gap between a disk and a cover plate.

A projection 144 jutting out toward the disk D to a predetermined height is formed in a portion of the cover plate 140 to oppose the disk D, thereby narrowing the gap G between the disk D and the bottom surface of the cover plate 140. The projection 144 may be partially formed along the through hole structure 142, but as shown in FIGS. 4 and 5, it may preferably be formed opposite the entire surface of the disk D around the through hole structure 142 in an annular shape. As shown in FIG. 8, as the gap G becomes narrower, the vibration level decreases. So long as there are no structural restrictions, it is preferable to set the gap G as narrow as possible to the extent that there is no danger of the rotating disk D colliding with the cover plate 140. The projection 144 can be manufactured during fabrication of the cover plate 140, thus eliminating the need for a separate manufacturing process. That is, the cover plate 140 is made out of a thin metal plate using a press machine, during which the projection 144 may be formed by a drawing process, which is one type of press forming.

As the gap G between the disk D and the cover plate 140 decreases in this way, air pressed between the disk D and the cover plate 140 serves to damp out vibration, thus reducing vibration of the disk. Vibration reduction in the disk D caused by air damping due to decrease in the gap G will be described more fully later with reference to the results of experiments.

Figure 6:
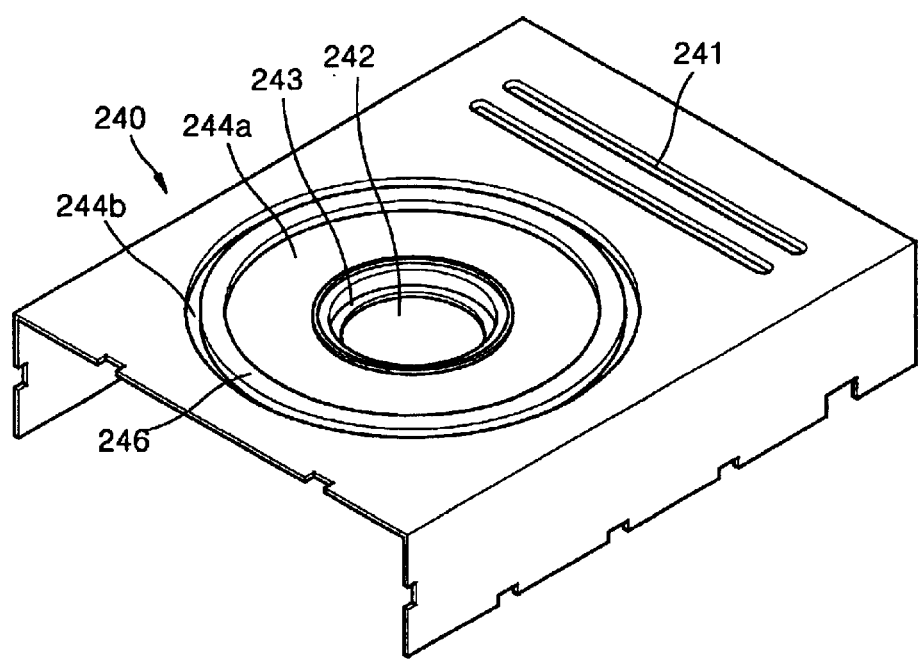
FIG. 6 is a perspective view of a cover plate for an optical disk drive according to a second embodiment of the present invention.
Figure 7A:
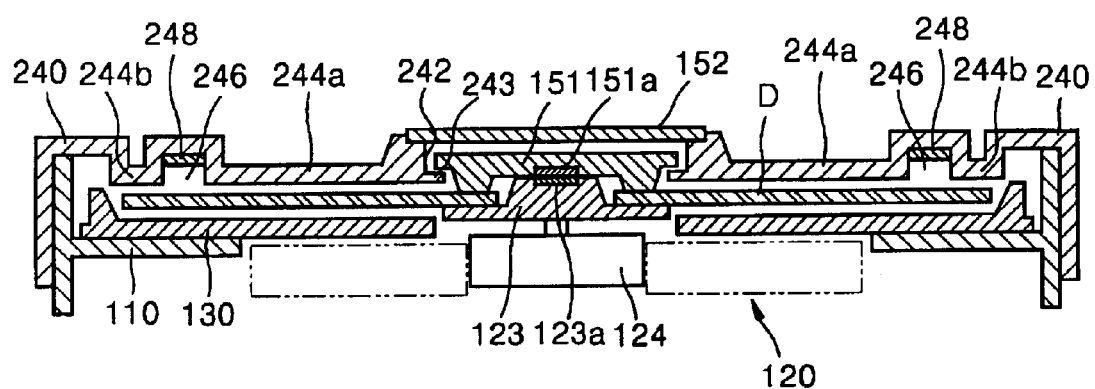
FIG. 7A is a vertical cross-section showing a state in which the cover plate of FIG. 6 has been coupled onto the main frame.
Figure 7B:
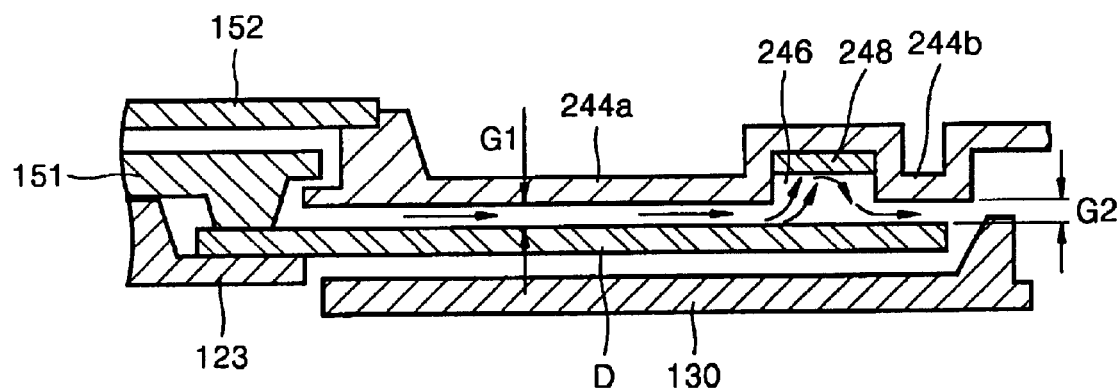
FIG. 7B is a detailed view showing a part of the cover plate.

FIG. 6 is a perspective view of a cover plate for an optical disk drive according to a second embodiment of the present invention. FIG. 7A is a vertical cross-section showing a state in which the cover plate of FIG. 6 has been coupled onto the main frame, and FIG. 7B is a detailed view showing a part of the cover plate. Here, the same reference numerals as in FIGS. 4 and 5 showing the first embodiment of the present invention represent the same element.

Referring to FIGS. 6, 7A, and 7B, a cover plate 240 according to the second embodiment of the present invention, like in the first embodiment described above, has a through hole structure 242 through which the disk clamp 151 is fitted in the center, and a groove 241 on the top. Further, a circular step 243 is formed along the inner circumference of the through hole structure 242. Since the functions of such elements are the same as those in the first embodiment above, a detailed description thereof will be omitted.

First and second projections 244a and 244b jutting out toward the disk D to predetermined heights are formed in portions of the cover plate 240 opposite the disk D. The first projection 244a is formed opposite a surface corresponding to an inner circumference of the disk D around the through hole structure 242 in an annular shape. Thus, as a first gap $G_1$ between the disk D and the bottom surface of the first projection 244a is decreased, air pressed between the disk D and the cover plate 240 serves to damp out vibrations, thereby reducing vibrations of the disk D. The second projection 244b is formed in a portion of the cover plate 240 opposite a surface corresponding to an edge of the disk D in an annular shape, which makes a second gap $G_2$ between the disk D and the bottom surface of the second projection 244b narrower. In this case, the second gap $G_2$ is preferably made as narrow as the first gap $G_1$.

Furthermore, the cover plate has a circular step 246 formed between the first and second projections 244a and 244b for lowering acoustic energy density of noise. The circular step 246 is formed opposite a surface corresponding to an outer circumference of the disk D in the shape of an annular groove. Like in the first embodiment described above, the circular step 246 may be made concurrently with the cover plate 240 using press forming techniques.

As the disk D rotates at high speed, as described above, various kinds of noise are generated. Since linear velocity on the outer circumference of the disk D is at least four times higher than that on the inner circumference, air pressure on the outer circumference of the disk D is lower than that on the inner circumference. Thus, rotation of the disk D and the pressure difference create a turbulent air flow whirling from the inner circumference to the outer circumference. The noise is then transmitted along this air flow from the inner circumference of the disk D into the outer circumference. As the first gap $G_1$ between the disk D and the first projection 244a, through which air flows, becomes significantly wider on the surface corresponding to the outer circumference of the disk D due to the circular step 246, acoustic energy density of noise escaping through the first gap $G_1$ drastically decreases in the circular step 246. Noise in which acoustic energy density decreases in this way is discharged through the second gap $G_2$ of the same size between the disk D and the second projection 244b. By doing so, the noise level is reduced. This principle is similar to that of a car muffler. That is, after expanding sound waves of airflow noise input in an expansion tube to make the density of acoustic energy small, mufflers discharge noise through an output tube of the same size as an input tube, thereby abating noise In this invention, the first gap $G_1$ between the surface on the inner circumference of disk D and the first projection 244a corresponds to the input tube of a muffler, the circular step 246 of the cover plate 240 corresponds to the expansion tube, and the second gap $G_2$ between the surface of the edge of disk D and the second projection 244b corresponds to the output tube. Thus, the second embodiment of the cover plate according to this invention can achieve a noise reduction just as car mufflers can.

Furthermore, since the first and second projections 244a and 244b and the circular step 246 are formed on the cover plate 240 in the shape of an annular groove, the present invention achieves incidental effects to reinforce the strength of the cover plate 240. A sound-absorbent material 248 may be attached to the inner wall of the circular step 246, for example, onto the top surface thereof. The sound-absorbent material 248 serves to absorb some amount of acoustic energy whose density becomes lower in the circular step 246, thereby further attenuating noise. Here, materials such as well-known sound-absorbent material, including a sponge having numerous fine ventilation holes, may be used as the sound-absorbent material 248.

Reductions in disk vibration and noise in an optical disk drive having a cover plate according to this invention will now be described with reference to results of experiments conducted in relation thereto.

Figure 9A:
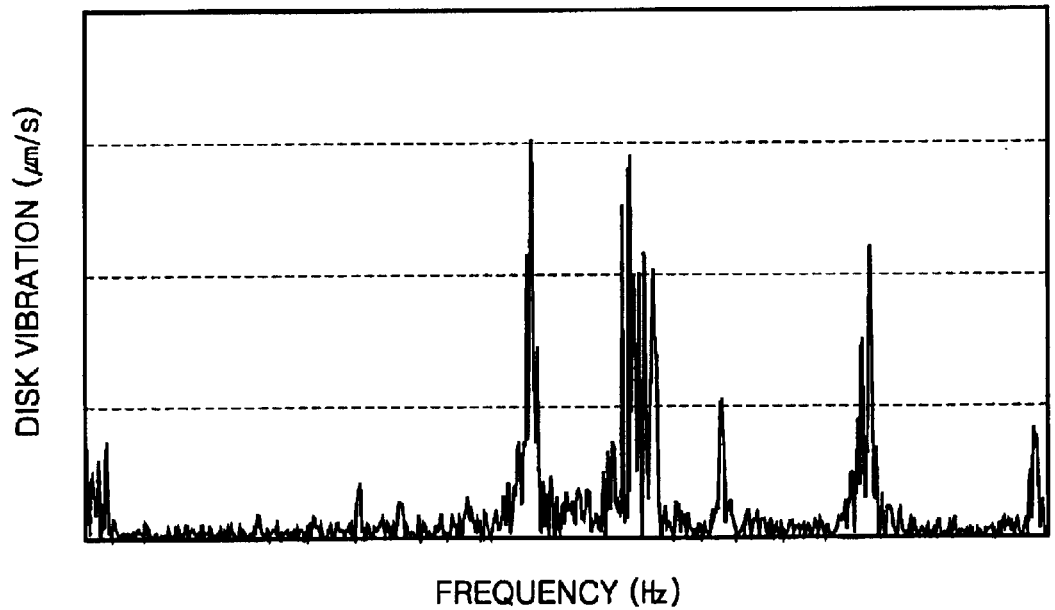
FIG. 9A shows a disk vibration spectrum in a conventional optical disk drive.
Figure 9B:
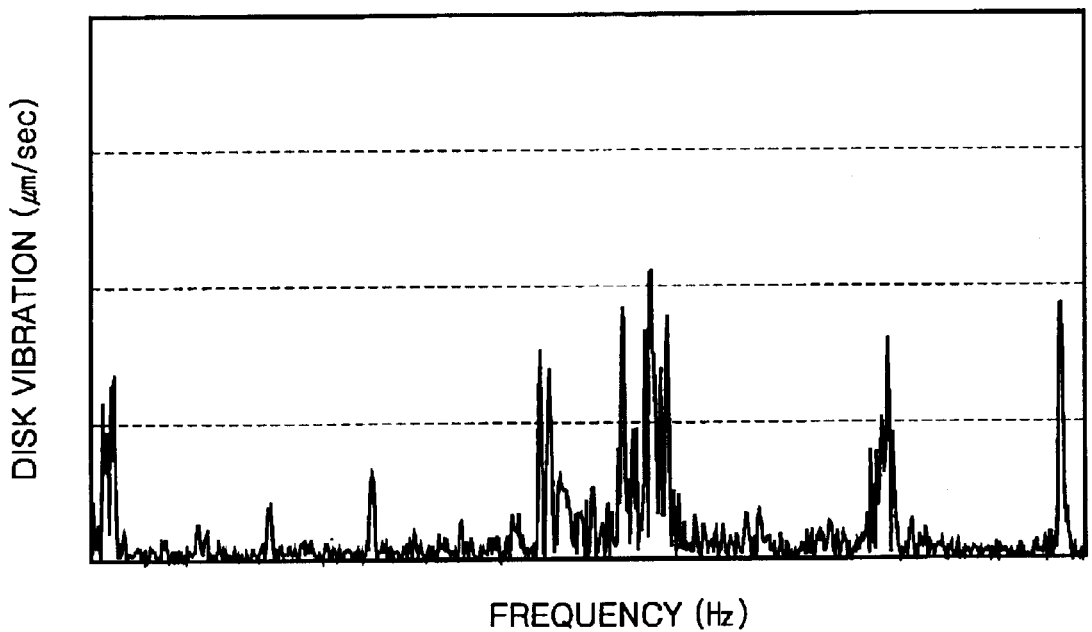
FIG. 9B shows a disk vibration spectrum in an optical disk drive having a cover plate according to the present invention.

FIG. 8 is a graph showing changes in disk vibration with respect to changes in a gap between a disk and a cover plate. FIG. 9A shows a disk vibration spectrum in a conventional optical disk drive, and FIG. 9B shows a disk vibration spectrum in an optical disk drive having a cover plate according to the present invention.

First, referring to FIG. 8, as a gap between the cover plate and the disk decreases, disk vibration decreases. Referring to FIGS. 9A and 9B, it has been demonstrated that an optical disk drive having a cover plate according to the present invention featuring a narrower gap with a disk exhibited significant disk vibration reduction, compared to a conventional optical disk drive featuring a wider gap between a cover plate and a disk The reason for disk vibration being suppressed as the gap between the cover plate and the disk decreases is that air between the cover plate and the disk acts to damp out the disk vibration. That is, where a gap between the disk and the opposite surface is wide, air between them acts as a compressible fluid so it changes volume without flowing into or out of a space between the disk and the opposite surface. In contrast, where the gap between the disk and the opposite surface is sufficiently narrow, air between them is near-incompressible so it exhibits damping effects to absorb disk vibration energy, thus reducing disk vibration.

Figure 10:
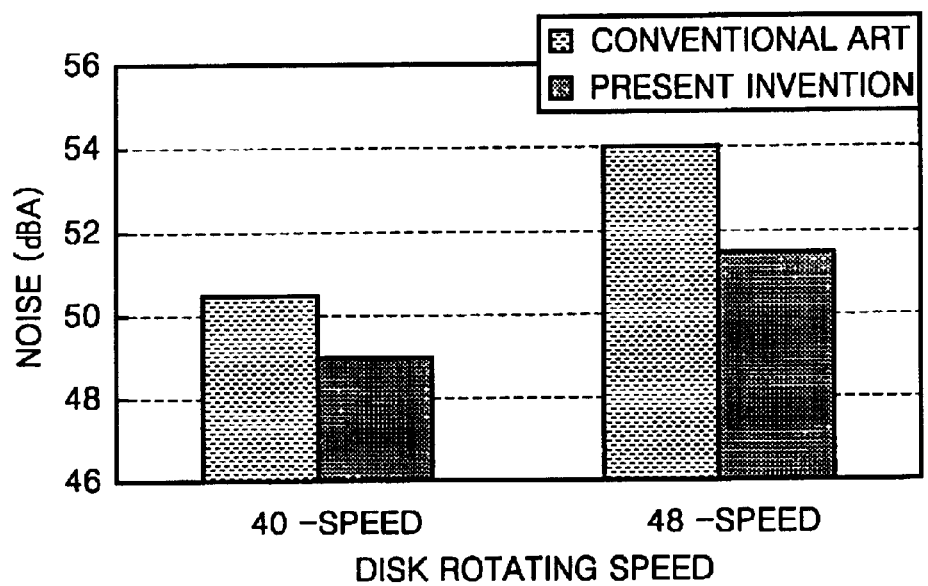
FIG. 10 is a graph showing comparison of noise generated for each rotating speed of a disk in the optical disk drive having the cover plate according to the second embodiment of the present invention and noise in a conventional optical disk drive.

FIG. 10 is a graph showing the comparison of noise generated for each rotating speed of a disk in the optical disk drive having the cover plate according to the second embodiment of the present invention and noise in a conventional optical disk drive As is evident from FIG. 10, a noise level in the optical disk drive having a cover plate with a circular step according to the present invention was about 1.5 to 2.5 dB lower than noise level in the conventional optical disk drive, regardless of disk rotating speed. In particular, it can also be shown that this invention provided a higher degree of noise reduction at higher rotating speed.

Figure 11:
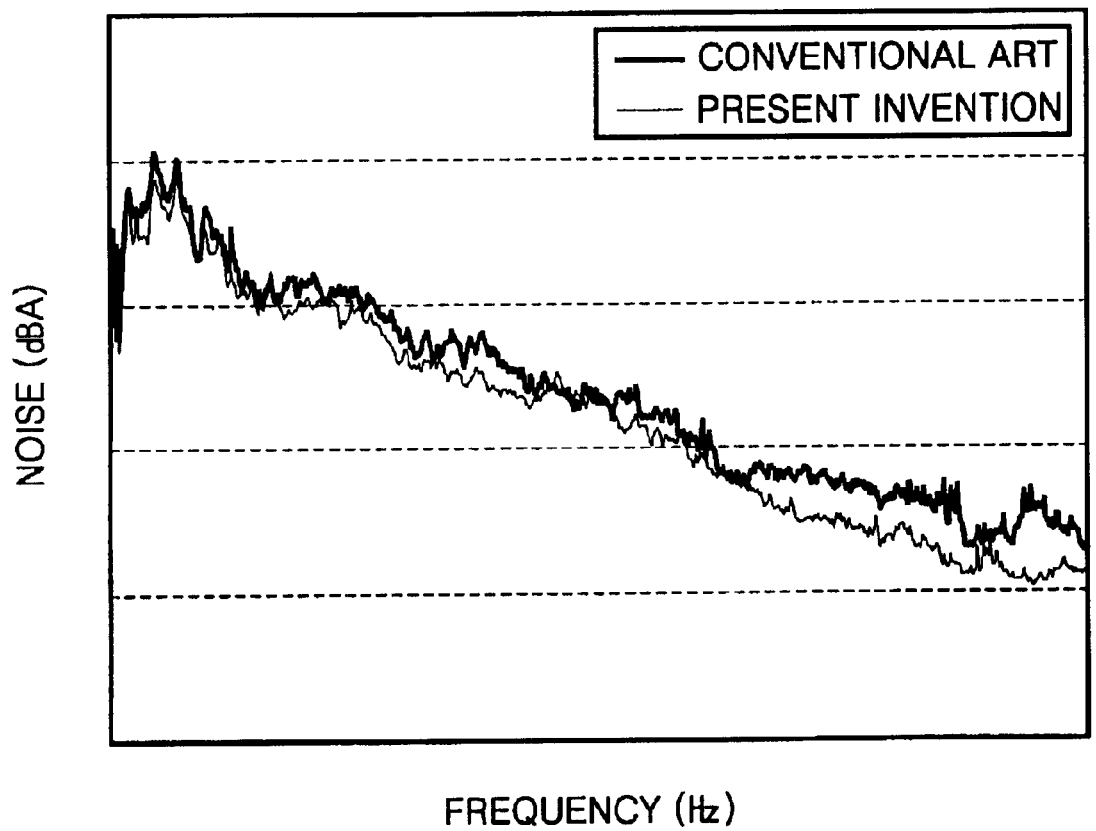
FIG. 11 is a graph showing comparison of a noise spectrum in the optical disk drive having the cover plate according to the second embodiment of the present invention and a noise spectrum in a conventional optical disk drive.

FIG. 11 is a graph showing the comparison of a noise spectrum in the optical disk drive having the cover plate according to the second embodiment of the present invention and a noise spectrum in a conventional optical disk drive. As is evident from FIG. 11, the optical disk drive having the cover plate according to the present invention provided excellent noise reduction over the entire frequency range compared to the conventional optical disk drive.

As described above, a cover plate for an optical disk drive according to the present invention provides reduction in disk vibration due to air damping effects resulting from a narrow gap between the disk and the cover plate, thereby enhancing reliability in data recorded on or played back from the disk. In addition, noise induced by air flow is attenuated by a circular step that performs the same function as a car muffler, thereby providing a more pleasant work environment. Furthermore, the present invention can be implemented without a separate device by making simple changes to the structure of a cover plate.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A cover plate for an optical disk drive, which is installed above a main frame of the optical disk drive and has a through hole structure in the center through which a disk clamp for clamping a disk placed on a turntable is fitted, the cover plate comprising a projection formed to oppose the disk around the through hole structure up to a predetermined height in order to narrow a gap with the disk, the protection extending radially from the through hole structure to the edge of the disk.

2. The cover plate of claim 1, wherein the projection is formed around the through hole structure in an annular shape.

3. A cover plate for an optical disk drive, which is installed above a main frame of the optical disk drive and has a through hole structure in the center through which a disk clamp for clamping a disk placed on a turntable is fitted, the cover plate comprising first and second projections jutting out toward the disk to predetermined heights for narrowing a gap between the cover plate and the disk, and a circular step formed between the first and second projections in the shape of an annular groove for lowering acoustic energy density of noise, wherein the first projection, the second projection, and the circular step are formed at portions of the cover plate opposite surfaces corresponding to an inner circumference, an edge, and an outer circumference of the disk, respectively.

4. The cover plate of claim 3, wherein a gap between the first projection and a surface corresponding to the inner circumference of the disk is as narrow as a gap between the second projection and the surface corresponding to the edge of the disk.

5. The cover plate of claim 3, wherein a sound-absorbent material is attached to an inner wall of the circular step for absorbing some amount of sound acoustic energy.

6. The cover plate of claim 5, wherein the sound-absorbent material is a porous material having numerous fine ventilation holes.

7. A cover plate for a disk drive, which is installed above a main frame of the disk drive and has a through hole structure in a center through which a disk clamp for clamping the disk is placed on an end table is fitted, the cover plate comprising a projection defining an opposing surface extending radially from the through hole structure to the edge of the disk, and formed to contiguously oppose the disk to provide a gap between the disk and the opposing surface of the cover plate being sufficiently narrow that air between the disk and cover plate is near-incompressible and exhibits a damping effect to absorb disk vibration energy.

8. The cover plate of claim 7, wherein the projection is formed around the through hole structure in an annular shape.

* * * * *